(12) United States Patent
Choi et al.

(10) Patent No.: US 11,175,024 B2
(45) Date of Patent: Nov. 16, 2021

(54) LIGHT EMITTING PANEL WITH IMPROVED HANDLING

(71) Applicants: Yeon Seo Choi, Seoul (KR); Jung Eun Lee, Hwaseong-si (KR)

(72) Inventors: Yeon Seo Choi, Seoul (KR); Jung Eun Lee, Hwaseong-si (KR)

(*) Notice: Subject to any disclaimer, the term of this patent is extended or adjusted under 35 U.S.C. 154(b) by 0 days.

(21) Appl. No.: 16/645,368

(22) PCT Filed: Aug. 9, 2018

(86) PCT No.: PCT/KR2018/009060
§ 371 (c)(1),
(2) Date: Mar. 6, 2020

(87) PCT Pub. No.: WO2019/050172
PCT Pub. Date: Mar. 14, 2019

(65) Prior Publication Data
US 2021/0164639 A1 Jun. 3, 2021

(30) Foreign Application Priority Data
Sep. 8, 2017 (KR) .......................... 10-2017-0115481

(51) Int. Cl.
*F21V 21/14* (2006.01)
*F21V 29/70* (2015.01)
(Continued)

(52) U.S. Cl.
CPC ............ *F21V 21/14* (2013.01); *F21V 23/001* (2013.01); *F21V 23/003* (2013.01); *F21V 29/70* (2015.01);
(Continued)

(58) Field of Classification Search
CPC ........ F21V 21/14; F21V 29/70; F21V 23/001; F21V 23/003; F21V 17/007;
(Continued)

(56) References Cited

U.S. PATENT DOCUMENTS 6,490,402 B1 * 12/2002 Ota .................... D02G 3/441
257/E25.02
10,697,624 B2 * 6/2020 Zhang .................. F21V 29/67
(Continued)

FOREIGN PATENT DOCUMENTS

KR  10-1120460       3/2012
KR  10-2013-0131848  12/2013

OTHER PUBLICATIONS

English Specification of 10-1120460.
English Specification of 10-2013-0131848

*Primary Examiner* — Bao Q Truong
(74) *Attorney, Agent, or Firm* — Antonio Ha & U.S. Patent, LLC

(57) ABSTRACT

Disclosed is a light emitting panel with improved handling. The light emitting panel includes a fabric made by weaving natural or synthetic fibers, light emitting string parts consisting of a plurality of light emitting devices electrically connected in parallel or series through conductive threads fixed to the fabric, at least one light emitting grid part including an electrode unit connecting the plurality of light emitting string parts in parallel, and a power supply part applying power to the light emitting grid part. The light emitting panel provides an easily controllable illumination area and a uniform luminance. In addition, the light emitting panel is foldable or rollable, achieving improved storability, portability and mobility. Furthermore, the light emitting panel has improved handling even in moist environments such as snowy or rainy days when used outdoors.

19 Claims, 13 Drawing Sheets

(51) Int. Cl.
*F21V 23/00* (2015.01)
*F21Y 105/10* (2016.01)
*F21Y 115/10* (2016.01)

(52) U.S. Cl.
CPC ....... *F21Y 2105/10* (2016.08); *F21Y 2115/10* (2016.08)

(58) Field of Classification Search
CPC .. F21Y 2105/10; F21Y 2115/10; G09F 13/06; G09F 13/22; G09F 9/33; G09F 9/301; G09F 13/08; G09F 13/12; G09F 2013/222; G03B 15/02; F21S 6/005
See application file for complete search history.

(56) References Cited

U.S. PATENT DOCUMENTS

| | | |
|---|---|---|
| 2006/0241878 A1 | 10/2006 | Stefan et al. |
| 2008/0010877 A1 | 1/2008 | Emmanuel et al. |
| 2015/0204496 A1* | 7/2015 | Cselenyi ................ D03D 15/54 362/190 |
| 2015/0227171 A1 | 8/2015 | Choi et al. |
| 2016/0029481 A1 | 1/2016 | Augoustidis et al. |
| 2018/0038578 A1* | 2/2018 | Son ..................... F21V 19/0015 |

* cited by examiner (a)

⬇ after soldering (b)

LIGHT EMITTING PANEL WITH IMPROVED HANDLING

TECHNICAL FIELD

The present invention relates to a light emitting panel with improved handling, and more specifically to a light emitting panel that provides an easily controllable illumination area and a uniform luminance, is foldable or rollable to achieve improved storability, portability and mobility, and is easy to handle even in moist environments such as snowy or rainy days when used outdoors.

BACKGROUND ART

Lighting systems are widely used to shoot movies in places where light is not abundant or create unusual scenes in the fields of film and video production. Various types and designs of lighting systems are provided according to their purpose of use. For example, lighting systems employing fluorescent lamps, halogen lamps, discharge lamps or metal halide lamps as the light sources are used to take pictures or videos outdoors or in studios.

Such lighting systems essentially include a support and a flat housing placed on the support. One or more lamps are mounted in the housing. A light collecting plate may also be placed at the tip of the housing to collect light from the lamps and irradiate the collected light in an open direction.

However, most general lighting lamps consume 200 W to 2 kW of power and have a limited lifetime of 3,000 to 9,000 hours. Such lamps greatly affect scenes depending on their performance while broadcasting and taking pictures. The color temperature of lighting lamps may vary after use for a certain period of time although their service life is not ended, with the result that the lamps need to be replaced with new ones earlier than their service life. This earlier replacement involves a considerable expense.

Lighting systems using triple wavelength lamps with high power efficiency and low heat emission have been developed. However, triple wavelength lamps are not suitable for use in lighting systems for broadcasting or special shooting that require a total luminous flux of at least 20,000 lumens (lm).

Recently, lighting systems using high-efficiency light emitting diodes (LEDs) have been developed. Such LED lighting systems are very efficient and economical because their energy consumption and lifetime are half and at least ten times those of existing lighting systems, respectively.

A general lighting system using LEDs is illustrated in FIG. 14. The lighting system essentially includes a support and a rigid flat housing placed on the support. A printed circuit board is mounted in the flat housing, a plurality of LED modules are mounted on the printed circuit board, and a light-transmitting panel is placed at the tip of the housing to prevent the printed circuit board and the LED modules from being exposed to ambient air. Since the lighting system has a fixed quadrangular shape as a whole and should maintain its total luminous flux at a high level, the installation of tens of lamps and hundreds of LED modules increases the overall size of the lighting system. Further, the transportation of the lighting system requires the use of a vehicle such as a truck with a large loading space. The lighting system is not easy to extend due to its fixed shape and should be combined with one or more other lighting systems to offer a higher level of brightness.

In attempts to solve these problems, Korean Patent No. 1120460 discloses a lighting system including a substrate part 10 in which a plurality of printed circuit boards 4 mounted with LED modules 2 are spaced apart from each other, a front cover 20 attached to the front side of the substrate part 10 and having a plurality of through-holes 22, a rear cover 30 attached to the rear side of the substrate part 10 to protect the substrate part 10, and power supply means 40 provided on the front cover 20 or the rear cover 30 to provide external power to the substrate part 10 (see FIGS. 15 and 16). The lighting system may optionally further include a fixing frame 60 to provide a support force such that the front cover 20 and the rear cover 30 are kept extended. The lighting system is foldable if needed to take up a little space. This foldability improves the storability, transportability, and portability of the lighting system and lowers the power consumption of the lighting system. However, the lighting system cannot be folded in the lengthwise direction of the printed circuit boards and is difficult to handle in moist environments such as snowy or rainy days when used outdoors.

DISCLOSURE OF INVENTION

Technical Problem

Therefore, it is an object of the present invention to provide a light emitting panel that provides an easily controllable illumination area and a uniform luminance, is foldable or rollable to achieve improved storability, portability and mobility, and is easy to handle even in moist environments such as snowy or rainy days when used outdoors.

Solution to Problem

One aspect of the present invention provides a light emitting panel with improved handling including a fabric made by weaving natural or synthetic fibers, light emitting string parts consisting of a plurality of light emitting devices electrically connected in parallel or series through conductive threads fixed to the fabric, at least one light emitting grid part including an electrode unit connecting the plurality of light emitting string parts in parallel, and a power supply part applying power to the light emitting grid part.

According to one embodiment of the present invention, the conductive threads may be warps or wefts used when the fabric is made by weaving.

According to a further embodiment of the present invention, the light emitting devices may be light emitting diodes.

According to another embodiment of the present invention, the conductive threads may be in electrical communication with the light emitting devices by soldering and the soldering may be performed using low melting point solders.

According to another embodiment of the present invention, heat dissipation support members may be interposed between the conductive threads and the light emitting devices.

According to another embodiment of the present invention, the conductive threads may use stainless steel and a sus flux may be applied to sites where the conductive threads are soldered to the light emitting devices or the heat dissipation support members.

According to another embodiment of the present invention, the heat dissipation support members may be PCBs.

According to another embodiment of the present invention, the heat dissipation support members may extend from a base through bridges such that they are arranged at predetermined intervals, may be soldered to electrodes of the light emitting devices, and may be soldered to the conductive threads on the back sides thereof; and the bridges may be cut after soldering.

According to another embodiment of the present invention, the heat dissipation support members may be patterned such that the soldering sites of the heat dissipation support members are in electrical communication with the back sides thereof through an extending conductive material.

According to another embodiment of the present invention, the direction in which the plurality of light emitting string parts are arranged may cross the direction in which the plurality of light emitting devices are arranged.

According to another embodiment of the present invention, the power supply part may include a control unit for controlling light emission from the light emitting grid part and the electrode unit of the light emitting grid part may be connected to the control unit.

According to another embodiment of the present invention, the electrode unit of the light emitting grid part may be opened from an electrode unit of an adjacent light emitting grid part and the two electrode units may be connected to the control unit.

According to another embodiment of the present invention, the electrode unit may be a copper, aluminum or silver thin layer.

According to another embodiment of the present invention, the electrode unit may have a dual structure in which an aluminum or silver thin layer is cladded with a copper thin layer.

According to another embodiment of the present invention, the light emitting panel may further include transverse or longitudinal sewn parts formed adjacent to the light emitting devices, the light emitting string parts or the light emitting grid part.

According to another embodiment of the present invention, a functional layer having openings may be formed on or under the fabric such that the light emitting devices and the heat dissipation support members are exposed through the openings.

According to another embodiment of the present invention, the functional layer may be an exothermal tape.

According to another embodiment of the present invention, a heat resistant layer may be formed on or under the electrode unit.

According to another embodiment of the present invention, the heat resistant layer may have insulation properties.

According to another embodiment of the present invention, the conductive threads may surround the heat resistant layer and may be soldered to the electrode unit.

According to another embodiment of the present invention, the heat resistant layer may be perforated with through-holes through which the conductive threads pass and are soldered to the electrode unit.

According to another embodiment of the present invention, the heat resistant layer may be formed on the electrode unit and a second heat resistant layer may be formed under the electrode.

According to another embodiment of the present invention, a finishing layer may be formed on each conductive thread.

Another aspect of the present invention provides a lighting system including the light emitting panel, a rotating rod around which the light emitting panel is rollable or unrollable, a housing, rotation guides located at both opposite ends of the housing to guide smooth rotation of the rotating rod, an elongated hole formed at one side of the housing and through which the light emitting panel passes and is rolled or unrolled, and a power supply part applying power to the light emitting grid part of the light emitting panel exposed through the elongated hole.

According to another embodiment of the present invention, the light emitting grid part may be adjacent to a light emitting grid part having an electrode unit.

According to another embodiment of the present invention, the power supply part may include a control unit for controlling light emission from the light emitting grid part and the electrode unit of the light emitting grid part may be connected to the control unit.

According to another embodiment of the present invention, the electrode unit of the light emitting grid part may be opened from an electrode unit of an adjacent light emitting grid part and the two electrode units may be connected to the control unit.

According to another embodiment of the present invention, the electrode unit may be a copper, aluminum or silver thin layer.

According to another embodiment of the present invention, a cooling part may be attached to one end of the housing to produce convection in the housing.

According to another embodiment of the present invention, the lighting system may further include a cooling part at one end of the housing.

According to another embodiment of the present invention, the cooling part may include an outer plate and an inner plate, a narrow space may be formed between the outer plate and the inner plate, compressed air may be discharged through the narrow space, and the discharged air may flow along the surface of the inner plate.

Advantageous Effects of Invention

The light emitting panel of the present invention provides an easily controllable illumination area and a uniform luminance. In addition, the light emitting panel of the present invention is foldable or rollable, achieving improved storability, portability and mobility. Furthermore, the light emitting panel of the present invention has improved handling even in moist environments such as snowy or rainy days when used outdoors.

MODE FOR INVENTION

Technical terms used in this specification are used to merely illustrate specific embodiments and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning.

In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms "include" or "has" used herein should be understood that they are intended to indicate an existence of several components or several steps, disclosed in the specification, and it may also be understood that part of the components or steps may not be included or additional components or steps may further be included.

Embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Figure 1:
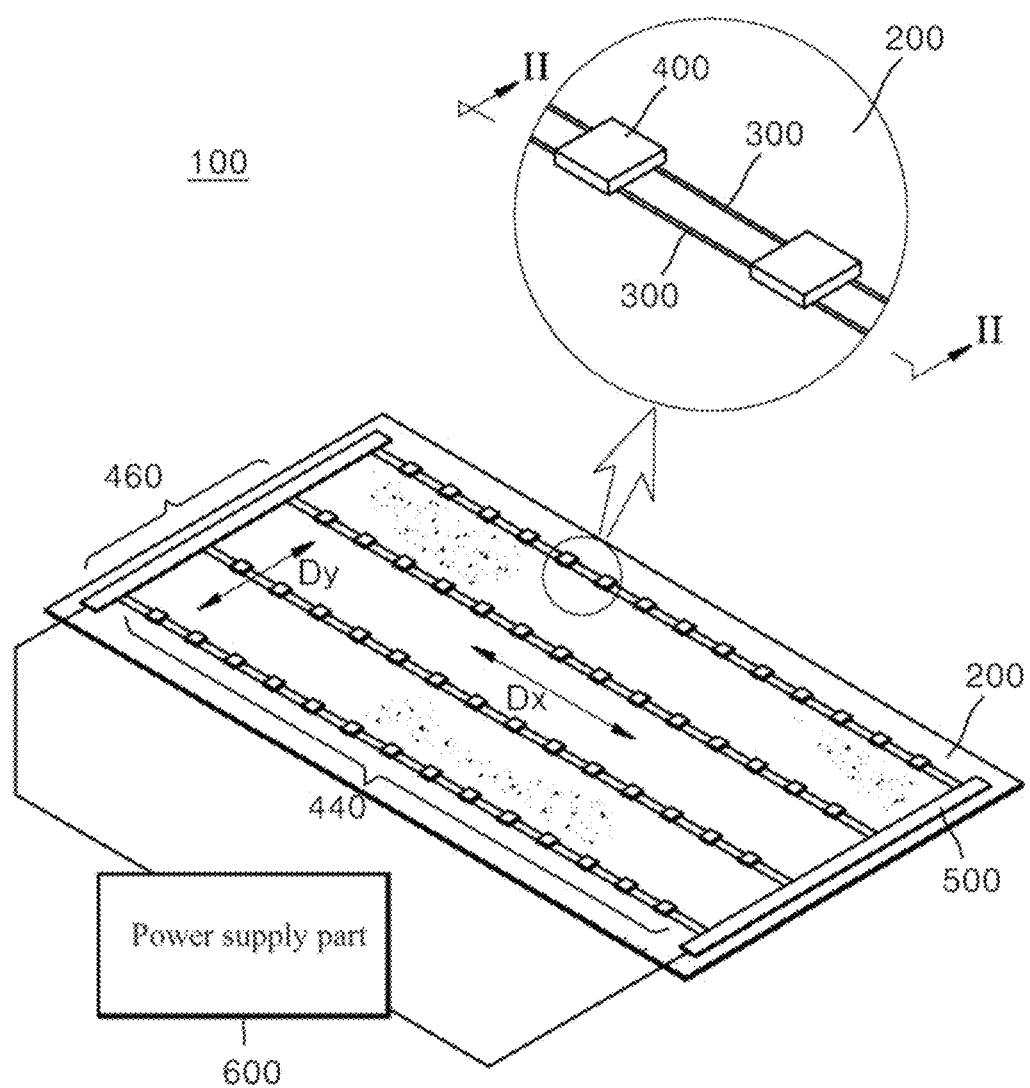
FIG. 1 is a perspective view of a light emitting panel according to one embodiment of the present invention.
Figure 2:
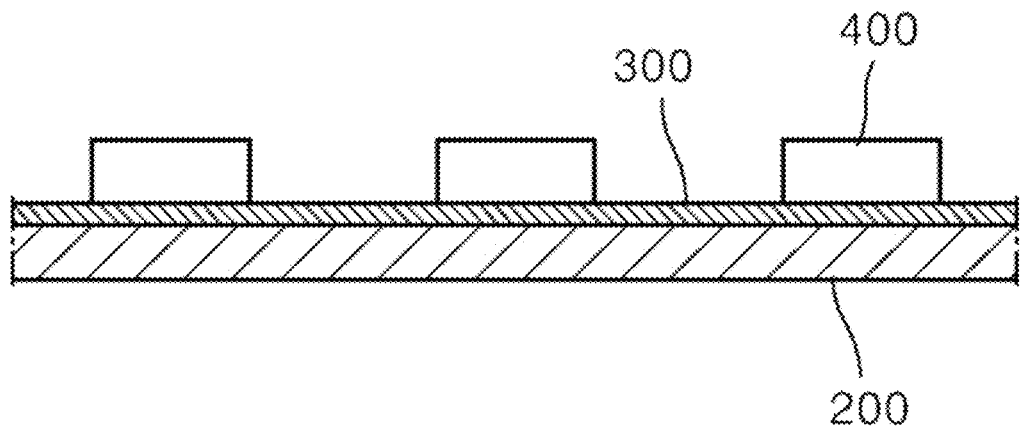
FIG. 2 is a cut-away cross-sectional view taken along line II-II of FIG. 1.
Figure 3:
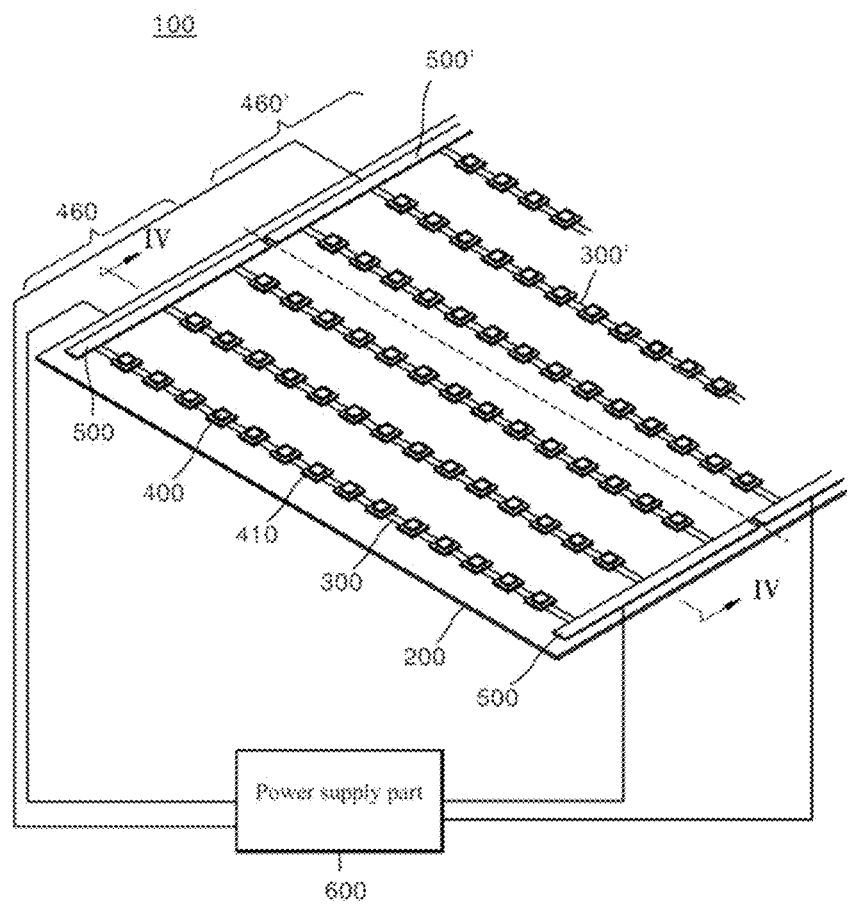
FIG. 3 is a perspective view of a light emitting panel according to a further embodiment of the present invention.
Figure 4:
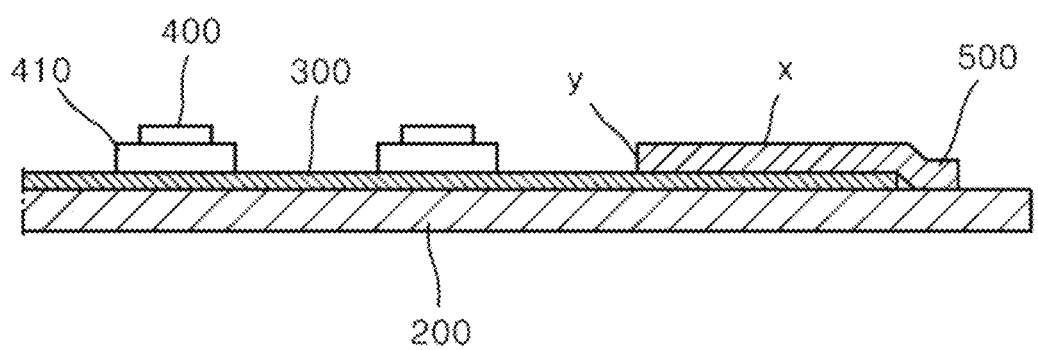
FIG. 4 is a cut-away cross-sectional view taken along line IV-IV of FIG. 3.
Figure 5:
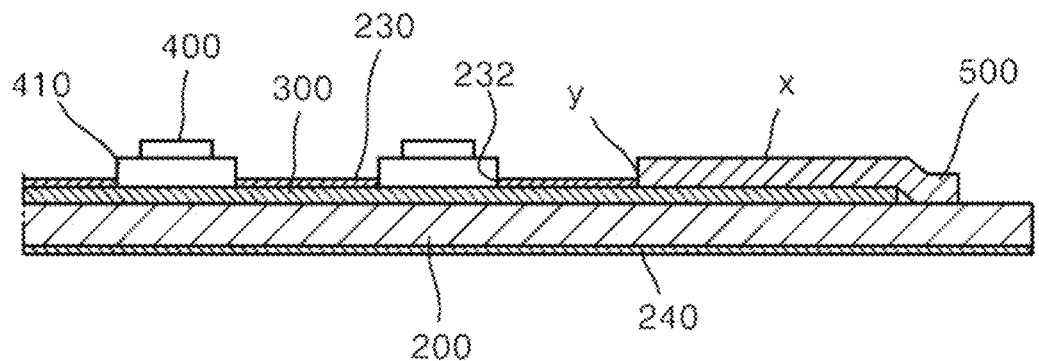
FIG. 5 illustrates a light emitting panel of the present invention in which upper and lower functional layers are formed on and under a fabric, respectively.
Figure 6:
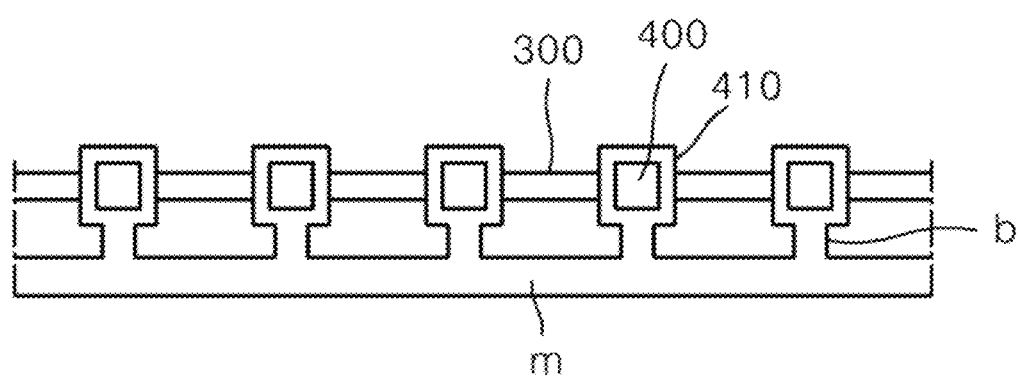
FIG. 6 illustrates a light emitting panel of the present invention in which heat dissipation support members extend from a base through bridges, light emitting devices and conductive threads are soldered to the upper and lower surfaces of the heat dissipation support members, respectively, and the bridges are cut after soldering.
Figure 6:
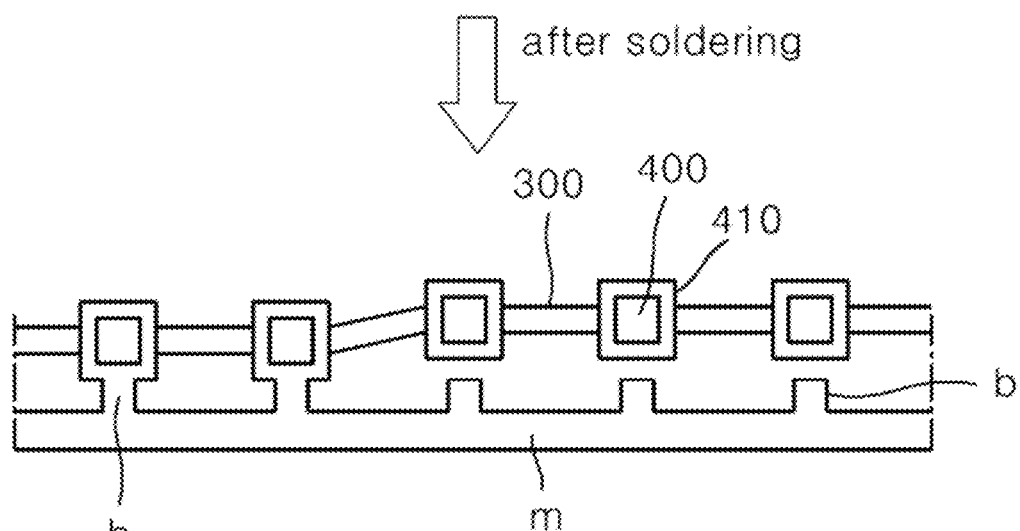
Figure 7:
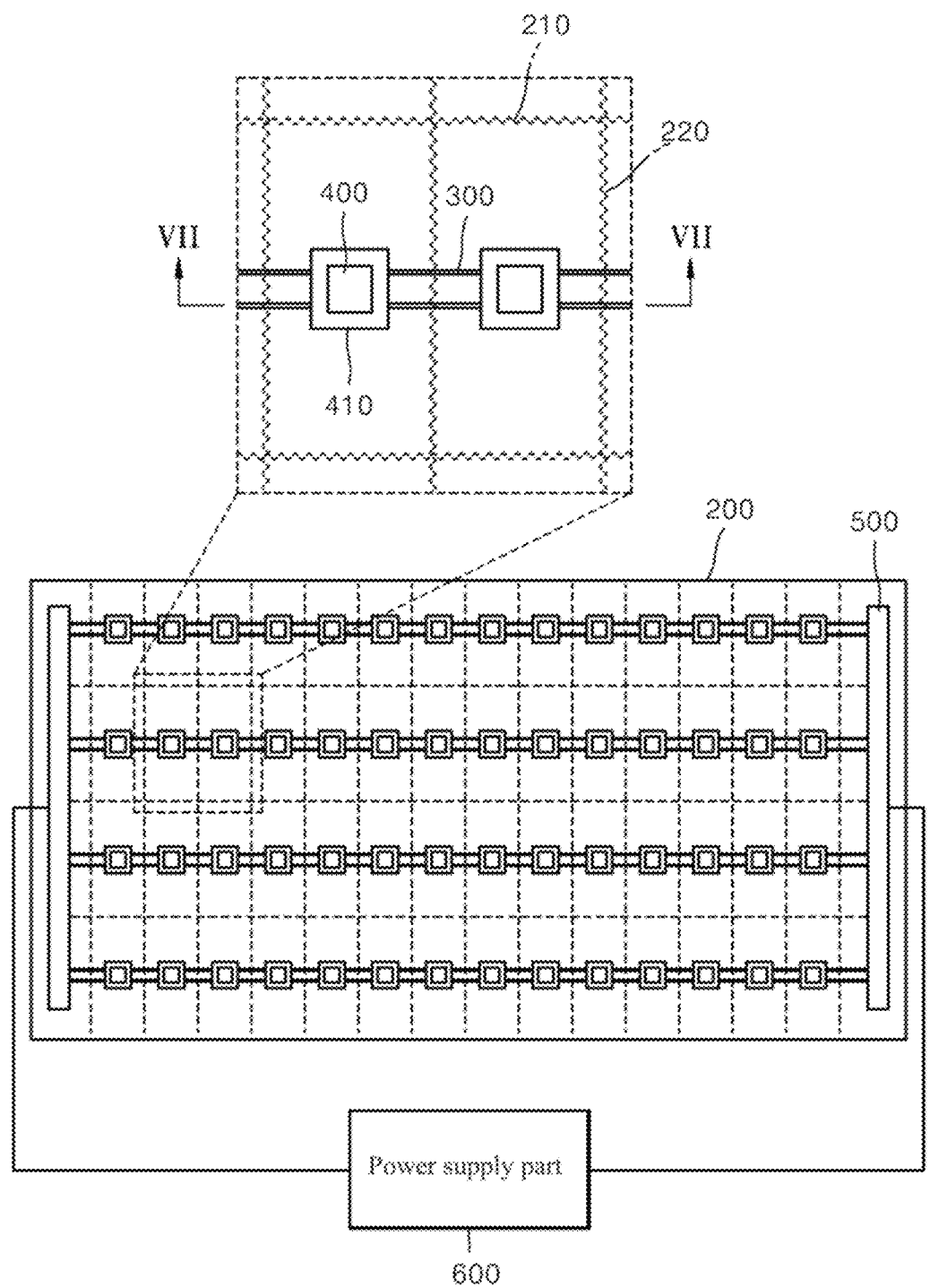
FIG. 7 is a plan view illustrating a light emitting panel of the present invention in which transverse and longitudinal sewn parts are formed.
Figure 8:
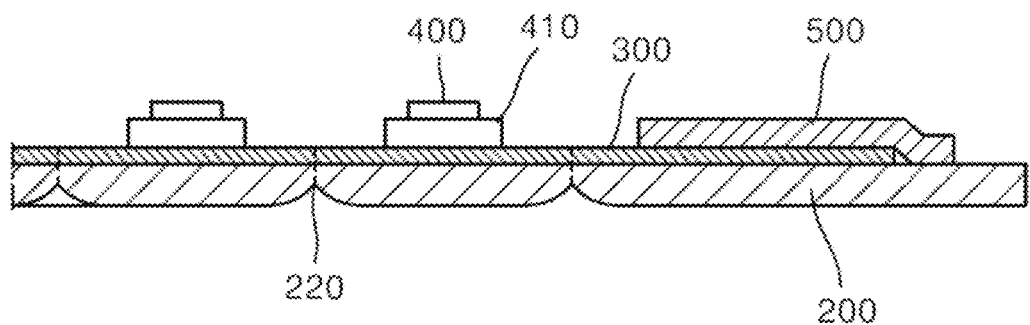
FIG. 8 is a cut-away cross-sectional view taken along line VI-VI of FIG. 7.
Figure 9:
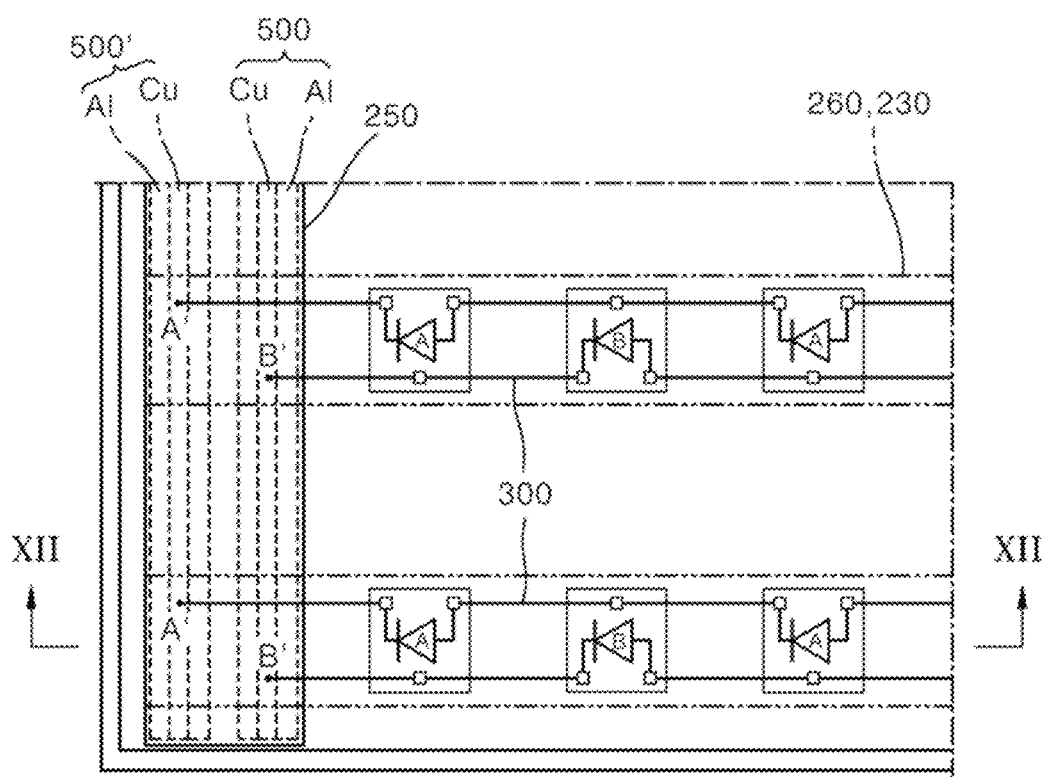
FIG. 9 is a plan view illustrating a light emitting panel of the present invention in which two different types of light emitting devices and electrode units are arranged.
Figure 10:
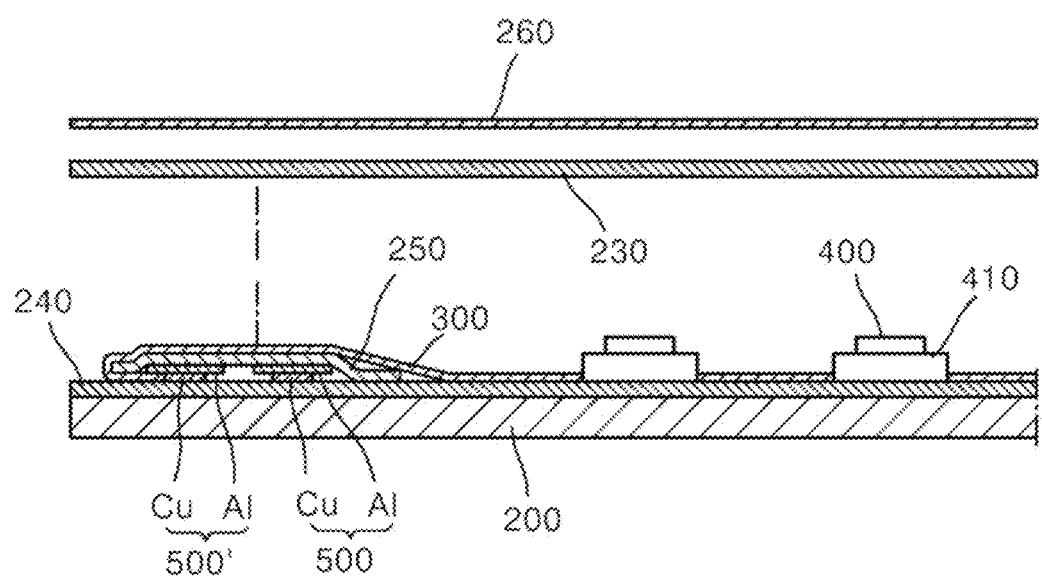
FIG. 10 is a cut-away cross-sectional view taken along line VII-VII of FIG. 9.
Figure 11:
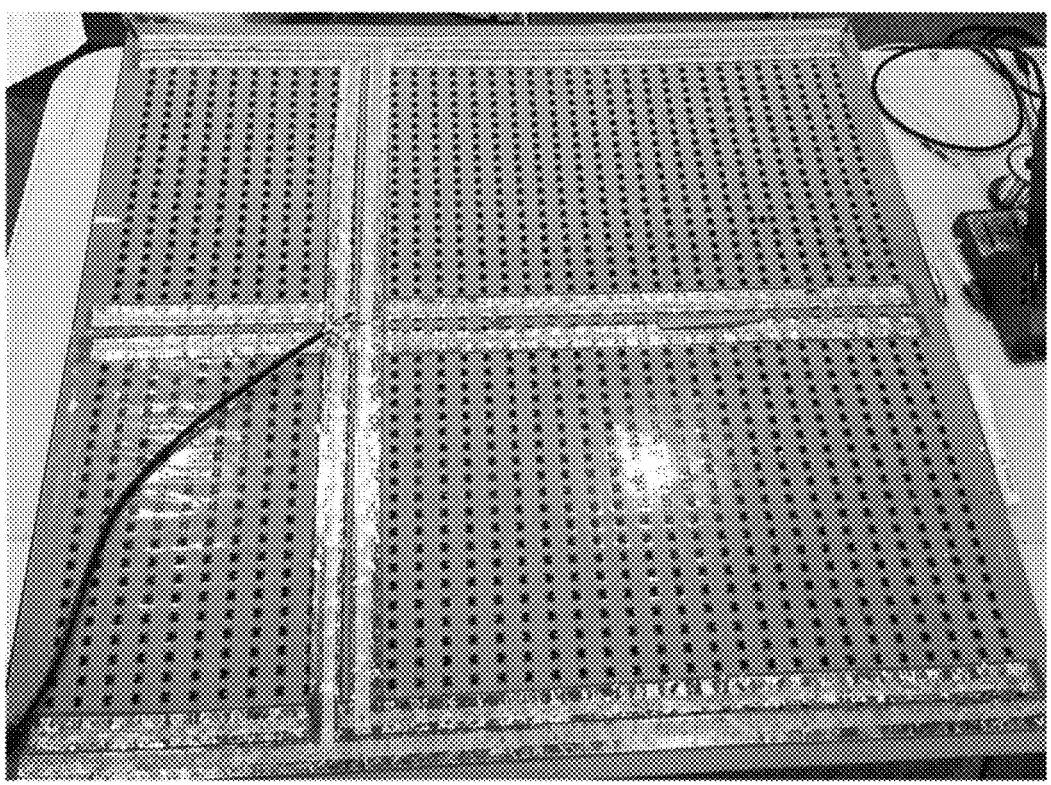
FIG. 11 is a photograph showing the rear side of a light emitting panel of the present invention.
Figure 12:
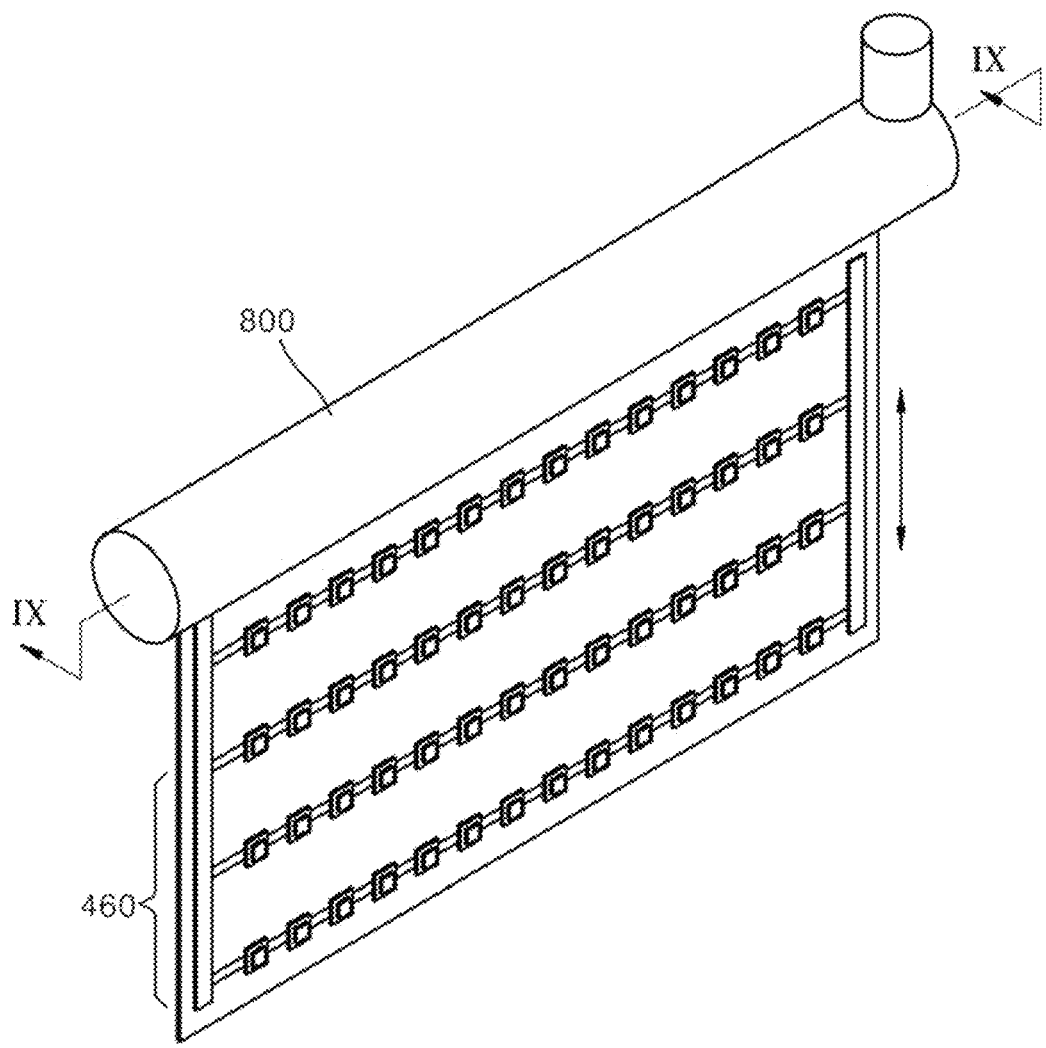
FIG. 12 is a perspective view illustrating a shape in which a light emitting panel of the present invention is unrolled from a rotating rod in a housing, passes through an elongated hole, and is exposed.
Figure 13:
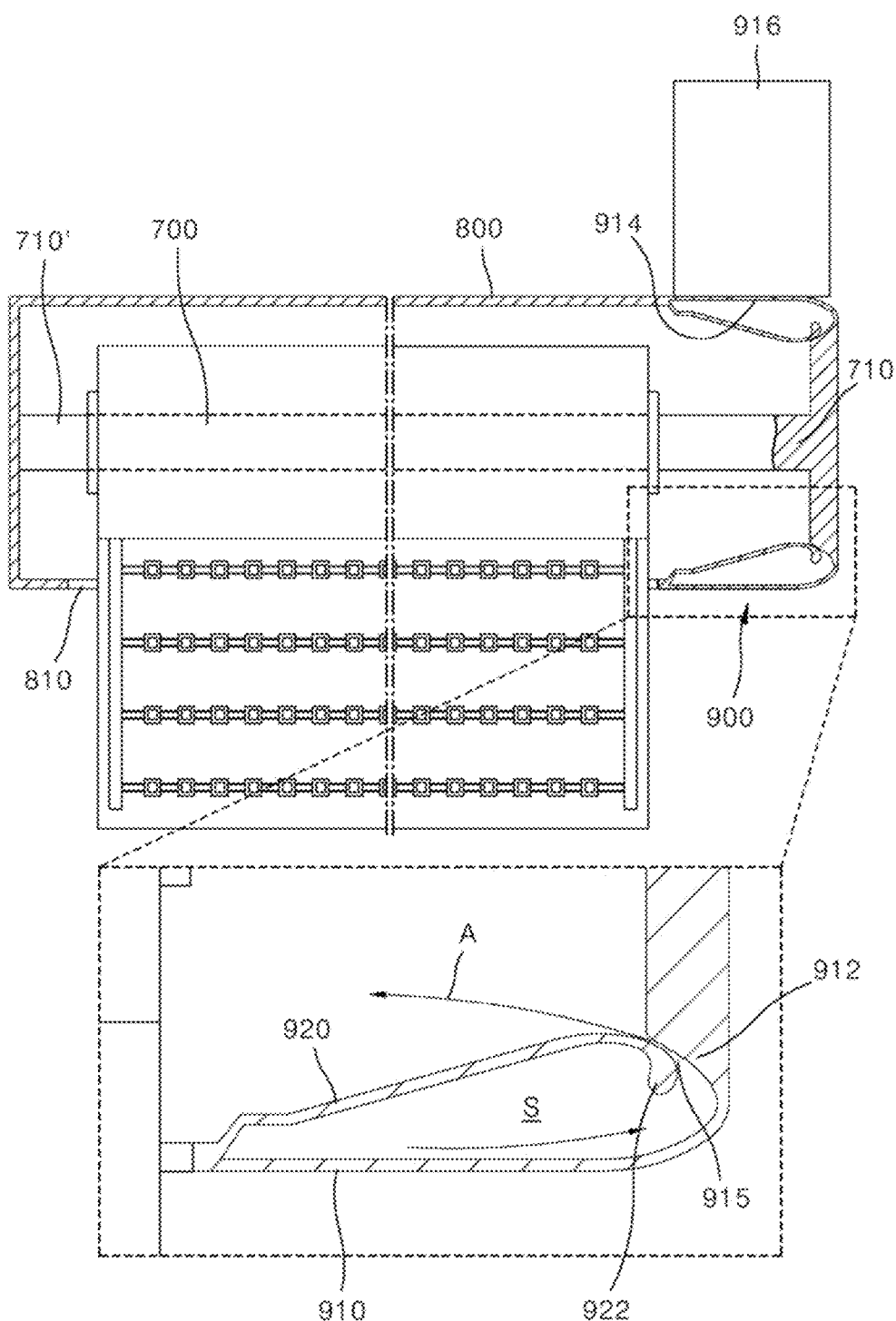
FIG. 13 is a cut-away cross-sectional view taken along line VIII-VIII of FIG. 12.
Figure 14:
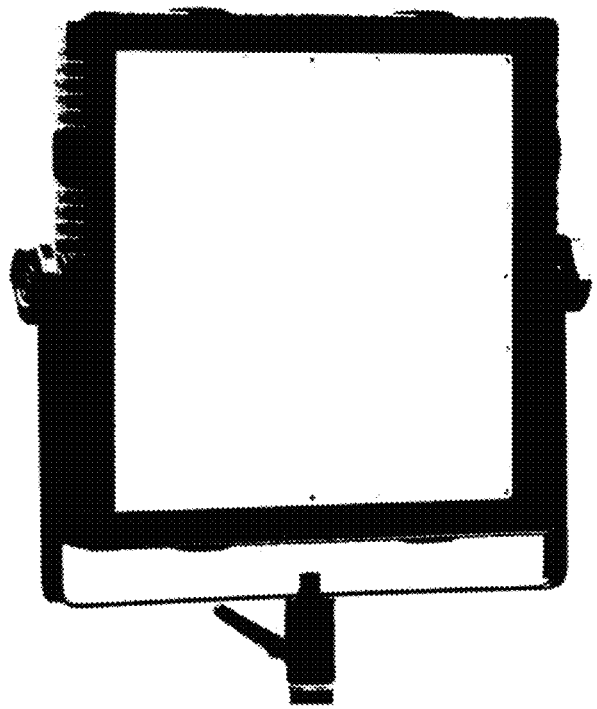
FIG. 14 is a photograph showing a conventional light emitting panel using light emitting diodes.
Figure 15:
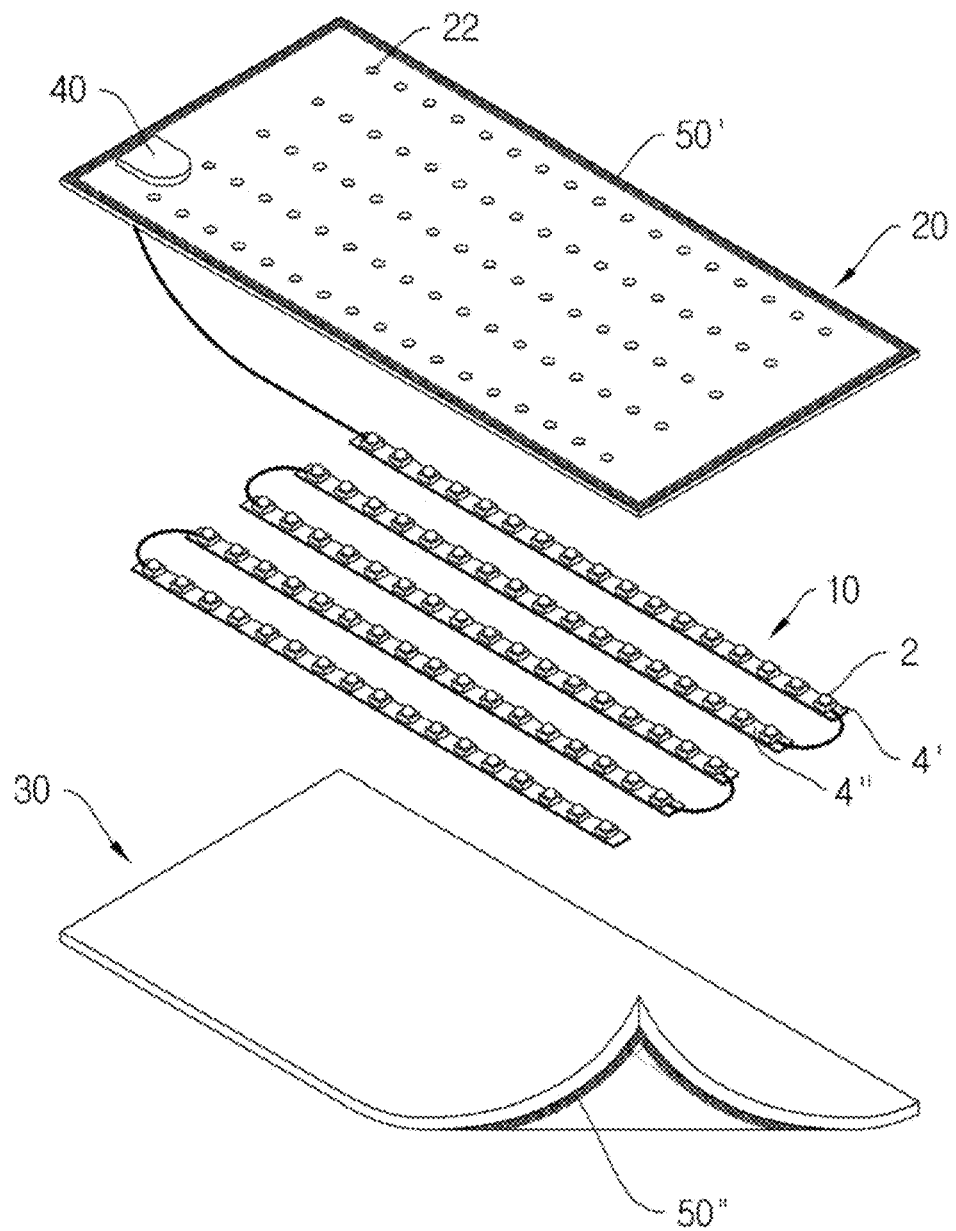
FIG. 15 is an exploded perspective view of a conventional panel using light emitting diodes.
Figure 16:
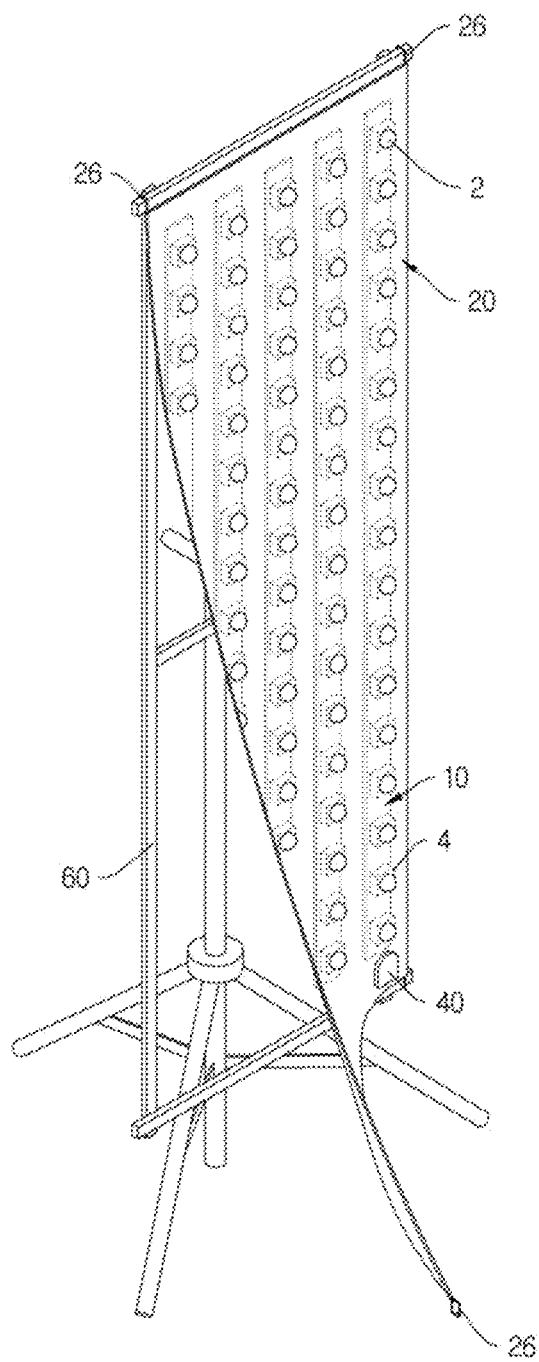
FIG. 16 is a view illustrating a shape of a conventional light emitting panel held by a fixing frame.

FIG. 1 is a perspective view of a light emitting panel according to one embodiment of the present invention, FIG. 2 is a cut-away cross-sectional view taken along line II-II of FIG. 1, FIG. 3 is a perspective view of a light emitting panel according to a further embodiment of the present invention, FIG. 4 is a cut-away cross-sectional view taken along line IV-IV of FIG. 3, FIG. 5 illustrates a light emitting panel of the present invention in which upper and lower functional layers are formed on and under a fabric, respectively, FIG. 6 illustrates a light emitting panel of the present invention in which heat dissipation support members extend from a base through bridges, light emitting devices and conductive threads are soldered to the upper and lower surfaces of the heat dissipation support members, respectively, and the bridges are cut after soldering, FIG. 7 is a plan view illustrating a light emitting panel of the present invention in which transverse and longitudinal sewn parts are formed, FIG. 8 is a cut-away cross-sectional view taken along line VI-VI of FIG. 7, FIG. 9 is a plan view illustrating a light emitting panel of the present invention in which two different types of light emitting devices and electrode units are arranged, FIG. 10 is a cut-away cross-sectional view taken along line VII-VII of FIG. 9, FIG. 11 is a photograph showing the rear side of a light emitting panel of the present invention, FIG. 12 is a perspective view illustrating a shape in which a light emitting panel of the present invention is unrolled from a rotating rod in a housing, passes through an elongated hole, and is exposed, FIG. 13 is a cut-away cross-sectional view taken along line VIII-VIII of FIG. 12, FIG. 14 is a photograph showing a conventional light emitting panel using light emitting diodes, FIG. 15 is an exploded perspective view of a conventional panel using light emitting diodes, and FIG. 16 is a view illustrating a shape of a conventional light emitting panel held by a fixing frame.

A light emitting panel 100 with improved handling according to the present invention includes a fabric 200 made by weaving natural or synthetic fibers, light emitting string parts 440 consisting of a plurality of light emitting devices 400 electrically connected in parallel or series through conductive threads 300 fixed to the fabric, at least one light emitting grid part 460 including an electrode unit 500 connecting the plurality of light emitting string parts 440 in parallel, and a power supply part 600 applying power to the light emitting grid part 460.

The fabric 200 is a substrate that prevents the conductive threads from being damaged or electrically opened while keeping the arrangements of the light emitting devices and the conductive threads. The fabric 200 may be made by weaving or knitting natural or synthetic fibers. A woven fabric is beneficial in achieving high durability in various environments such as repeated bending, wrinkling, and folding.

The natural or synthetic fibers are not specially limited as long as their material can ensure high durability in various environments such as repeated bending, wrinkling, and folding and is heat resistant enough to protect from deformation or damage caused by thermal energy accumulated during light emission.

The conductive threads 300 are fixed to the fabric. Examples of the natural fibers include wool, linen, cotton, and silk. Examples of the synthetic fibers include polyester, nylon, rayon, polyurethane, polypropylene, and acrylic fibers. These synthetic fibers may be used as a mixture thereof. The synthetic fibers may be used in admixture with natural fibers. The fibers are combined with a conductive material such as stainless steel, copper, silver or carbon black. Specifically, large aspect ratio nano-scale fine particles of the conductive material are incorporated into the fibers or are plated or deposited on the fibers to impart conductivity to the threads.

Due to their conductivity, the conductive threads 300 function as electrical leads through which electricity can be applied to the light emitting devices. In addition, the conductive threads 300 can be prevented from being opened by various movements (e.g., folding, bending, and rolling) of the fabric.

The conductive threads 300 electrically connect the plurality of light emitting devices 400 in parallel or series. The parallel or series connection of the light emitting devices can be appropriately determined depending on the brightness and arrangement of the light emitting devices. The light emitting devices 400 are typically light emitting diodes, particularly p-n junction diodes that emit light by recombination of excess electron-hole pairs.

Here, the conductive threads 300 are connected to the light emitting devices 400 by soldering such that the conductive threads 300 are in electrical communication with the light emitting devices 400. Especially, stainless steel is used as the conductive material of the conductive threads. In this case, a sus flux is applied to the conductive threads, followed by soldering. High bonding strength between the stainless steel and the solder ensures high durability.

The fiber material of the conductive threads tends to melt or degrade at a low temperature of about 150 to about 450° C. In view of this, a low melting point solder needs to be used.

Specifically, the low melting point solder is melted (i.e. soldered) and interposed between the conductive threads and the terminals of the light emitting devices. The solder may contain bismuth or include a zinc-tin alloy to prevent degradation of the fiber material. The melting point of the solder is preferably in the range of 150 to 450° C.

The solder may further contain an auxiliary metal, typically silver, or a flux for melting point control. In this case, bismuth may be used in an amount of 50 to 65% by weight, based on the total weight of the low melting point solder. If the bismuth content is less than 50% by weight, the tin content is relatively high, leading to an increase in the melting point of the solder. Meanwhile, if the bismuth content exceeds 65% by weight, the melting point of the solder is lowered but the contact resistance may be difficult to control.

The conductive threads may be used as warps arranged in the transverse direction or wefts arranged in the longitudinal direction when the fabric is made by weaving. The conductive threads can be fixed to the fabric with an adhesive such as an acrylic, silicone, epoxy or polyurethane adhesive. Alternatively, the fabric may be made by weaving, knitting or sewing the conductive threads according to a desired conductive pattern of the light emitting panel. This is beneficial in that a conductive circuit can be formed without using an adhesive to fix the conductive threads to the light emitting devices.

Heat dissipation support members 410 are interposed between the conductive threads 300 and the light emitting devices 400 to simultaneously ensure conductivity, workability, and heat dissipation performance.

The heat dissipation support members 410 may be printed circuit boards (PCBs). A conventional flexible LED panel has a conductive circuit formed by soldering LEDs to FPCBs. However, the solder joints between the LEDs and the FPCBs are liable to bend repeatedly, causing interfacial defects. This problem is avoided in the light emitting panel of the present invention by interposing the heat dissipation support members 410 (such as PCBs) between the conductive threads 300 and the light emitting devices 400. Specifically, the light emitting devices (e.g., LEDs) are attached to the heat dissipation support members (e.g., rigid PCBs), the heat dissipation support members are connected to each other through the conductive threads, followed by soldering. This soldering increases the bonding strength between the conductive threads and the heat dissipation support members and between the heat dissipation support members and the light emitting devices. An adhesive (e.g., an epoxy adhesive) may be applied to the solder joints to prevent the oxidation of the solder joints and reinforce the solder joints.

The heat dissipation support members are beneficial in releasing heat from the light emitting devices to the outside due to their superior heat dissipation performance compared to that of the fabric. Accordingly, the heat dissipation support members are effective in improving the durability of the light emitting panel according to the present invention.

It is difficult to directly solder the conductive threads 300 to the light emitting devices 400, particularly light emitting diodes, because the very movable conductive threads should be positioned at the desired soldering sites. In view of this difficulty, the heat dissipation support members are prepared by molding such that they extend from a base m through bridges b and are arranged at predetermined intervals, are soldered to electrodes of the light emitting devices 400, and are soldered to the conductive threads 300 on the back sides thereof. After soldering, the bridges b are cut and the heat dissipation support members are fixed to the fabric 200 using an adhesive to form the light emitting string parts 440.

The heat dissipation support members 410 are patterned such that the soldering sites of the heat dissipation support members 410 are in electrical communication with the back sides thereof. The electrical communication can be established by forming through-holes at corresponding locations and filling the through-holes with a conductive material.

The light emitting devices 400 are typically light emitting diodes using a binary or ternary compound semiconductor of Group 3A or 5A such as gallium arsenide (GaAs), gallium phosphide (GaP), gallium-arsenic-phosphorus ($GaAs_{(1-x)}P_x$), gallium-aluminum-arsenic ($Ga_{(1-x)}Al_xAs$), indium phosphide (InP) or indium-gallium-phosphorus ($In_{(1-x)}Ga_xP$). The light emitting diodes are operated in such a manner that when a voltage is applied in the forward direction through conductive terminals extending from both ends of the p-n junction, electrons in the n-type region recombine with holes in the p-type region to emit light. When the voltage is interrupted, the light emitting diodes are switched off.

The presence of moisture may deteriorate the current-carrying properties of the light emitting devices 400 and the conductive threads 300 on the fabric 200. This problem can be solved by attaching an upper functional layer 230 having openings 232 to the upper surface of the fabric 200. The plurality of light emitting devices 400 and the heat dissipation support members 410 are exposed through the openings 232 of the upper functional layer 230. There is no particular restriction on the material for the upper functional layer. Any waterproof or heat dissipating material may be used for the upper functional layer. For the purpose of special finishing, the circuit including the conductive threads but excluding the light emitting devices is covered with the upper functional layer. The use of an exothermal tape as the upper functional layer is effective in dissipating heat from the light emitting devices (e.g., LEDs). The effective heat dissipation ensures outstanding heat dissipation characteristics of the light emitting panel compared to those of conventional flexible LED sheets, thereby prolonging the lifetime of the light emitting devices. The exothermal tape serves to mediate the dissipation of heat to the outside and is also referred to as a "thermal pad". The exothermal tape is prepared by dispersing a ceramic powder in a polymer resin as a matrix.

A lower functional layer 240 may be attached to the lower surface of the fabric 200 through which moisture can enter. There is no particular restriction on the material for the lower functional layer. Any waterproof or heat dissipating material may be used for the lower functional layer.

When heat dissipation materials, particularly exothermal tapes, are employed as the upper and lower functional layers 230 and 240, the temperature of heat from the light emitting panel of the present invention can be reduced by 10° C., which is very preferable in terms of durability. For example, if exothermal tapes are not used, heat at a temperature of about 50° C. is generated and increases the ambient temperature of the shooting location, causing inconvenience in shooting a movie. In contrast, the use of exothermal tapes lowers the temperature of heat from the light emitting panel to around 30° C., thus being effective in remarkably improving the shooting environment.

The light emitting string parts 440 form a single unit in which the plurality of adjacent light emitting devices 400 are in electrical communication with each other through the conductive threads. The light emitting string parts form an electrical circuit with the electrode unit 500, which will be described below. Direct current is beneficial for power application in the forward direction.

The plurality of light emitting string parts 440 are connected in parallel through the electrode unit 500 to form the at least one light emitting grid part 460. The light emitting grid part is one lighting unit that helps effectively constitute the light emitting panel of the present invention, which will be described in more detail below.

Voltage drop may occur in the electrode unit 500 of the light emitting grid part to which the plurality of light emitting string parts are connected. Accordingly, it is necessary to overcome a difference in luminance between the light emitting devices and the light emitting string parts caused by voltage drop in order to ensure high-quality lighting for obtaining high-resolution closeup images. The use of a conductive material with a low electrical resistance, for example, aluminum or copper, in the form of a thin layer is thus considered. Power is applied to the electrical circuit consisting of the light emitting devices (e.g., LEDs), the heat dissipation support members (e.g., PCBs), and the conductive threads through the electrode unit. That is, the largest amount of current flows through the electrode unit in the electrical circuit. If a conductive material in the form of a conductive thread is used for the electrode unit, the resistance of the electrode unit increases, resulting in a partial reduction in brightness (i.e. luminance). Alternatively, a copper thin layer (tape) may be used as the electrode unit. However, a copper thin layer is liable to be cut by repeated bending during actual use. Thus, the electrode unit is designed to have a dual structure in which an aluminum or silver thin layer is cladded with a copper thin layer. This structure ensures a sufficient amount of current for light emission. In addition, the silver or aluminum thin layer can maintain the current-carrying properties of the electrode unit even when the copper thin layer is cut. Furthermore, since copper is more effective in soldering than the aluminum or silver thin layer, heat applied to the fabric, the light emitting devices, the heat dissipation support members, and the conductive threads during soldering can be minimized.

The direction Dy in which the plurality of light emitting string parts 440 are arranged to constitute the light emitting grid part 460 crosses the direction Dx in which the plurality of light emitting devices are arranged to constitute the light emitting string parts. Preferably, the two directions theoretically form an angle of 90° (in actuality, the angle will be from about 80 to about 100° when the assembly tolerance is taken into consideration. Since the light emitting panel of the present invention is aimed at providing a uniform lighting luminance, unlike general surface light sources, it is necessary to arrange the light emitting devices of the light emitting string parts at uniform intervals in a constant direction and to arrange the light emitting devices at uniform intervals in a constant direction.

The thin layer means that the cross-sectional width x of the electrode unit 500 is larger than the cross-sectional height (thickness) y thereof. The durability of the electrode unit in the form of a thin layer can be maintained under various deformations such as bending and folding.

The light emitting panel of the present invention has a structure in which the light emitting devices 400, the heat dissipation support members 410, the light emitting string parts 440, and the light emitting grid part 460 are arranged on the fabric 200. Due to this structure, the fabric may be stretched or torn apart by various external forces such as pulling, tearing, and stretching, posing a risk that the conductive threads 300 may be directly cut and opened. To avoid this risk, it is necessary to sew areas around the light emitting devices, the light emitting string parts or the light emitting grid part. An external force or stress concentrates on the sewn areas, and as a result, the light emitting devices, the light emitting string parts, and the light emitting grid part can be protected from the external force.

As a result of this sewing, transverse sewn parts 210 may be formed along the arrangement direction of the light emitting devices of the light emitting string parts or longitudinal sewn parts 220 may be formed along the arrangement direction of the light emitting string parts of the light emitting grid part. If needed, either or both of the transverse sewn parts and the longitudinal sewn parts may be provided.

A heat resistant layer 250 may be formed on or under the electrode unit 500. The heat resistant layer 250 prevents heat generated during soldering from being directly delivered to the fabric 200, avoiding thermal damage to the fabric. In a situation where the light emitting devices of one of the string parts are defective and need to be replaced with new ones, the string part should be removed and replaced with a new one. In this repair procedure, the heat resistant layer 250 enables separation of the electrode unit and the conductive threads and ensures stable soldering of conductive threads of the new string part.

The electrode unit 500 is provided in plurality when different types of light emitting devices are alternately arranged in the string parts. For example, when two different types of light emitting devices A and B are provided, a heat resistant layer may be arranged over the electrode units 500 and 500' to insulate the electrode units.

If the heat resistant layer is arranged under the electrode unit 500, the conductive threads inevitably come into contact with the adjacent electrode unit 500', causing electrical shorting.

That is, the light emitting devices A in one string part form a solder joint A' with the electrode unit 500' and the light emitting devices A in the other string part form a solder joint A' with the electrode unit 500' so that power can be supplied through the electrode unit 500'.

The light emitting devices B in one string part form a solder joint B' with the other electrode unit 500 and the light emitting devices B in the other string part form a solder joint B' with the other electrode unit 500 so that power can be supplied through the other electrode unit 500.

To prevent shorting caused by the conductive threads 300 in the current-carrying paths of the solder joints A' and B', a heat resistant layer with insulation properties is preferably arranged over the electrode units such that the conductive threads surround the heat resistant layer and are soldered to the electrode units.

As used herein, the term "surround" can be understood to mean that the conductive threads are fixedly soldered to the electrodes unit while winding the heat resistant layer whose area is designed to be larger than that of each electrode unit. Due to this design, there is little or no risk of shorting. For the purpose of shortening the paths, the heat resistant layer may be perforated with through-holes through which the conductive threads pass. The perforation may be performed alone or simultaneously by taking into consideration workability and short-circuit protection.

Although two electrode units and two different types of light emitting devices have been exemplified above, their numbers are not limited thereto. It should be understood that more different types of light emitting devices and a larger number of electrode units can be provided.

The electrode units 500 and 500' lie in the same plane to connect the different types of light emitting devices in parallel but are not limited to this configuration. For example, several heat resistant layers may be arranged to overlap each other to insulate a plurality of layers of electrode units overlapping each other. In this case, a heat resistant layer is formed over electrode units, a second heat resistant layer is formed under the electrode units, and this overlapping structure is repeated one or more times.

A finishing layer 260 may be formed on each conductive thread 300. The finishing layer has the ability to reflect and scatter light from the light emitting devices. Due to its ability, the finishing layer allows the light emitting devices to well exhibit their luminance and color temperature and ensures uniformity of illuminance. The finishing layer may have heat dissipation and waterproof performance, like the upper functional layer. The finishing layer may have holes (not illustrated) through which the light emitting devices can be exposed.

Adhesives or adhesives tapes may be positioned at the contact areas between the conductive threads 300 and the light emitting devices 400 and at the contact areas between the conductive threads 300 and the fabric. The adhesives or adhesive tapes may be, for example, acrylic, polyurethane or silicone adhesives or adhesive tapes that can be elastically deformed by bending or folding.

The power supply part 600 is adapted to supply power to the light emitting grid part 460. The power supply part 600 may be a secondary battery such as a lithium ion battery or a primary battery such as a dry battery. Alternatively, the power supply part 600 may convert an alternating current directly supplied from a social power network.

The power supply part 600 may include a control unit (not illustrated) for controlling light emission from the at least one light emitting grid part 460. The control unit may be a device or module that is programmed to simultaneously, sequentially or alternately control switching on/off light emission from the plurality of light emitting grid parts 460.

Accordingly, the electrode unit 500 of the light emitting grid part 460 is opened from the electrode unit 500' of the adjacent light emitting grid part 460'. Thus, the electrode units are connected to the control unit through different circuits, which is very beneficial for providing light emission through the individual light emitting grid parts, which will be described in detail below.

The present invention also provides a lighting system including the light emitting panel 100, a rotating rod 700 around which the light emitting panel 100 is rollable or unrollable, a housing 800, rotation guides 710 and 710' located at both opposite ends of the housing to guide smooth rotation of the rotating rod, an elongated hole 810 formed at one side of the housing and through which the light emitting panel passes and is rolled or unrolled, and a power supply part applying power to the light emitting grid part 460 of the light emitting panel exposed through the elongated hole.

The light emitting panel 100 remains unrolled around the rotating rod 700 during storage or transportation. The rotation guides 710 and 710' may be bushings provided in the housing 800. The rotating rod is turnably fastened to the rotation guides 710 at both ends thereof. A plurality of friction-reducing members such as rolling bearings may be disposed between the rotation guides and the rotating rod to assist in smooth rotation of the rotating rod.

The rotation guides 710 and 710' located at both ends of the housing 800 are members that rotate together with the rotating rod or assist in rotating the rotating rod. General rolling bearing members may be used as the rotation guides.

If needed, the rotating rod 700 and the rotation guides 710 and 710' may be controlled such that the rotation guides 710 and 710' are turnable in conjunction with an electric-powered motor in a state in which the rotating rod is fixed. Alternatively, the light emitting panel 100 may be manually rolled around or unrolled from the rotating rod 700 using a grip (not illustrated) extending from one of the rotation guides or the rotating rod.

In the case where light emission from a portion of the light emitting panel unrolled from the rotating rod, for example, only one light emitting grid part 460, is required during shooting, the control unit controls light emission by applying power only to the light emitting grid part exposed through the elongated hole.

This is possible because the adjacent light emitting grid parts are connected to the different electrode units. Specifically, the electrode units connected to the adjacent light emitting grid parts are opened from each other and are connected to the control unit (not illustrated) such that only the exposed light emitting grid part emits light and the portion of the light emitting panel remaining rolled in the housing 800 is switched off, contributing to energy saving.

Heat released from the exposed light emitting grid part and heat accumulated in the light emitting grid rolled in the housing after light emission may adversely affect the lifetime and quality of the light emitting devices. Thus, a cooling part is disposed at one end of the housing 800 to cool not only the interior of the housing and the light emitting grid part exposed through the elongated hole.

The cooling part 900 may employ means such as a cooling fan that can dissipate heat by the convection of compressed air. Here, it is necessary to consider the fact that the space of the light emitting panel 100 introduced into the housing 800 makes it difficult to convect or blow air.

The cooling part 900 includes an outer plate 910 and an inner plate 920 between which a narrow space is formed as a discharge channel 915. Compressed air A is discharged through the discharge channel 915 and flows along the surface of the inner plate (the inner surface of the housing) 920.

The cooling part has one end portion where the outer plate 910 and the inner plate 920 meet together. In the other end portion of the cooling part, the outer plate 910 and the inner plate 920 approximates to each other. The outer plate 910 and the inner plate 920 are wide open to form an inner space S. In the other end portion of the cooling part, the curvature of the inner plate 920 is small and one end 922 of the inner plate is placed inside one end 912 of the outer plate.

The outer plate 910 is perforated with a supply hole 914 at one side thereof. When a compressed air supply part is connected to the supply hole through which compressed air A is supplied. The compressed air A is discharged through the discharge channel defined between the outer plate 910 and the inner plate 920 and is supplied along the inner surface of the housing. The compressed air accumulated in the housing is expelled to the outside through the elongated hole, particularly along the surface of the light emitting grid part, with the result that heat accumulated in the light emitting devices can be effectively and directly removed.

Here, the compressed air supply part 916 is an exhaust fan. Alternatively, the compressed air supply part 916 may use a compressor installed outside the housing or a pressure tank accommodating air compressed by a compressor.

EXPLANATION OF REFERENCE NUMERALS

Light emitting panel 100 Fabric 200
Transverse sewn part 210 Longitudinal sewn part 220
Upper functional layer 230 Lower functional layer 240
Heat resistant layer 250 Finishing layer 260
Conductive thread 300 Light emitting device 400
Heat dissipation support member 410
Light emitting string part 440
Light emitting grid part 460 Adjacent light emitting grid part 460'
Electrode unit 500 Power supply part 600
Rotating rod 700 Rotation guides 710, 710'
Housing 800 Elongated hole 810
Cooling part 900 Outer plate 910
One end of the outer plate 912 Supply hole 914
Discharge channel 915 Compressed air supply part 916
Inner plate 920 One end of the inner plate 922
Compressed air A Bridge b
Arrangement direction of the light emitting string parts Dx
Arrangement direction of the light emitting devices Dy
Base m Inner space S
Cross-sectional height of the electrode unit y
Cross-sectional width of the electrode unit x

The invention claimed is:

1. A lighting system comprising a light emitting panel with improved handling, comprising a fabric made by weaving natural or synthetic fibers, light emitting string parts consisting of a plurality of light emitting devices electrically connected in parallel or series through conductive threads fixed to the fabric, at least one light emitting grid part comprising an electrode unit connecting the plurality of light emitting string parts in parallel, and a power supply part applying power to the light emitting grid part, wherein a rotating rod around which the light emitting panel is rollable or unrollable, a housing, rotation guides located at both opposite ends of the housing to guide smooth rotation of the rotating rod, an elongated hole formed at one side of the housing and through which the light emitting panel passes and is rolled or unrolled, and a power supply part applying power to the light emitting grid part of the light emitting panel exposed through the elongated hole.

2. The lighting system according to claim 1, wherein the conductive threads are warps or wefts used when the fabric is made by weaving.

3. The lighting system according to claim 1, wherein the conductive threads are in electrical communication with the light emitting devices by soldering and the soldering is performed using low melting point solders.

4. The lighting system according to claim 1, wherein heat dissipation support members are interposed between the conductive threads and the light emitting devices.

5. The lighting system according to claim 1, wherein the conductive threads use stainless steel and a sus flux is applied to sites where the conductive threads are soldered to the light emitting devices or heat dissipation support members.

6. The lighting system according to claim 4, wherein the heat dissipation support members are PCBs, and wherein the heat dissipation support members extend from a base through bridges such that they are arranged at predetermined intervals, are soldered to electrodes of the light emitting devices, and are soldered to the conductive threads on the back sides thereof; and the bridges are cut after soldering.

7. The lighting system according to claim 4, wherein the heat dissipation support members are patterned such that soldering sites of the heat dissipation support members are in electrical communication with the back sides thereof through an extending conductive material.

8. The lighting system according to claim 1, wherein the direction in which the plurality of light emitting string parts are arranged crosses the direction in which the plurality of light emitting devices are arranged.

9. The lighting system according to claim 1, wherein the power supply part comprises a control unit for controlling light emission from the light emitting grid part and the electrode unit of the light emitting grid part is connected to the control unit, and wherein the electrode unit of the light emitting grid part is opened from an electrode unit of an adjacent light emitting grid part and the two electrode units are connected to the control unit.

10. The lighting system according to claim 9, wherein the electrode unit has a dual structure in which an aluminum or silver thin layer is cladded with a copper thin layer.

11. The lighting system according to claim 1, further comprising transverse or longitudinal sewn parts formed adjacent to the light emitting devices, the light emitting string parts or the light emitting grid part.

12. The lighting system according to claim 4, wherein a functional layer having openings is formed on or under the fabric such that the light emitting devices and the heat dissipation support members are exposed through the openings.

13. The lighting system according to claim 12, wherein the functional layer is an exothermal tape.

14. The lighting system according to claim 1, wherein a heat resistant layer is formed on or under the electrode unit, and wherein the heat resistant layer has insulation properties.

15. The lighting system according to claim 1, wherein the conductive threads surround the a heat resistant layer and are soldered to the electrode unit.

16. The lighting system according to claim 1, wherein a heat resistant layer is perforated with through-holes through which the conductive threads pass and are soldered to the electrode unit.

17. The lighting system according to claim 14, wherein the heat resistant layer is formed on the electrode unit and a second heat resistant layer is formed under the electrode.

18. The lighting system according to claim 1, wherein a finishing layer is formed on each conductive thread.

19. The lighting system according to claim 1, further comprising a cooling part at one end of the housing, wherein a cooling part is attached to one end of the housing to produce convection in the housing, and wherein the cooling part comprises an outer plate and an inner plate, a narrow space is formed between the outer plate and the inner plate, compressed air is discharged through the narrow space, and the discharged air flows along the surface of the inner plate.

* * * * *